US010475033B2

(12) United States Patent
Mankad et al.

(10) Patent No.: US 10,475,033 B2
(45) Date of Patent: Nov. 12, 2019

(54) METHODS AND SYSTEMS FOR TRANSACTIONAL RISK MANAGEMENT

(71) Applicant: Citibank, N.A., New York, NY (US)

(72) Inventors: Rupa Mankad, District 15 (SG); Mahantesh Mukartihal, Edison, NJ (US); Ramiro Munoz, New Canaan, CT (US)

(73) Assignee: CITIBANK, N.A., New York, NY (US)

( * ) Notice: Subject to any disclaimer, the term of this patent is extended or adjusted under 35 U.S.C. 154(b) by 247 days.

(21) Appl. No.: 13/965,664

(22) Filed: Aug. 13, 2013

(65) Prior Publication Data
US 2015/0052050 A1 Feb. 19, 2015

(51) Int. Cl.
*G06Q 20/40* (2012.01)

(52) U.S. Cl.
CPC ................. *G06Q 20/4016* (2013.01)

(58) Field of Classification Search
None
See application file for complete search history.

(56) References Cited

U.S. PATENT DOCUMENTS

| | | | | |
|---|---|---|---|---|
| 7,539,644 B2* | 5/2009 | Hu et al. | ......................... | 705/38 |
| 7,610,040 B2* | 10/2009 | Cantini | ................. | G06Q 20/04 340/5.9 |
| 7,624,070 B2 | 11/2009 | Lebouitz | | |
| 7,822,663 B2 | 10/2010 | Tyson-Quah | | |
| 7,848,847 B2 | 12/2010 | Mougin | | |
| 8,296,232 B2* | 10/2012 | Tullis et al. | ..................... | 705/39 |
| 2001/0034718 A1* | 10/2001 | Shaked | ................... | G06F 21/31 705/64 |
| 2002/0062249 A1* | 5/2002 | Iannacci | ................ | G06Q 20/10 705/14.1 |
| 2003/0140007 A1* | 7/2003 | Kramer | .................. | G06Q 20/04 705/40 |
| 2003/0177087 A1* | 9/2003 | Lawrence | .............. | G06Q 20/04 705/38 |
| 2006/0149674 A1* | 7/2006 | Cook | ..................... | G06Q 20/40 705/44 |
| 2007/0233599 A1 | 10/2007 | Ganesan et al. | | |

(Continued)

FOREIGN PATENT DOCUMENTS

WO     WO 2010/126524 A1    11/2010

OTHER PUBLICATIONS

Daihong et al., "Risk Assessment Management for Mobile Payment Security", 2008 IEEE/SOLI International Conference on Service Operation and Logistics, and Informatics, vol. 2, Oct. 12-15, 2008, pp. 1966-1970.

(Continued)

*Primary Examiner* — Robert R Niquette
(74) *Attorney, Agent, or Firm* — John M. Harrington, Esq.; Johnson, Marcou & Isaacs, LLC (57) ABSTRACT

Methods and systems for managing transactional risk involve, for example, receiving and assessing, using a processor coupled to memory, entity payment transaction information for a predetermined level of risk based at least in part on a payment transaction history of the entity. Likewise using the processor, a report of the predetermined level of risk may be generated, and the payment transaction may be processed for the entity according to predefined processing instructions of the entity.

8 Claims, 4 Drawing Sheets

(56) References Cited

U.S. PATENT DOCUMENTS

| | | | |
|---|---|---|---|
| 2009/0063312 A1* | 3/2009 | Hurst | G06Q 20/105 705/30 |
| 2009/0125427 A1* | 5/2009 | Atwood et al. | 705/35 |
| 2009/0222369 A1* | 9/2009 | Zoldi | G06Q 10/10 705/35 |
| 2009/0234899 A1 | 9/2009 | Kramer | |
| 2010/0017333 A1* | 1/2010 | Turgeon | G06F 21/32 705/67 |
| 2010/0257096 A1* | 10/2010 | Duggal | G06Q 20/10 705/44 |
| 2011/0264612 A1 | 10/2011 | Ryman-Tubb | |
| 2011/0276468 A1* | 11/2011 | Lewis | G06Q 10/0635 705/38 |
| 2011/2764468 | 11/2011 | Lewis et al. | |
| 2012/0016731 A1* | 1/2012 | Smith | G06O 20/20 705/14.33 |
| 2012/0158585 A1* | 6/2012 | Ganti | G06Q 20/40 705/44 |
| 2012/0303522 A1 | 11/2012 | May et al. | |
| 2012/0330689 A1* | 12/2012 | McLaughlin et al. | 705/4 |
| 2013/0036036 A1 | 2/2013 | Zoldi et al. | |

OTHER PUBLICATIONS

Perez et al, "Outlier Detection Applying an Innovative User Transaction Modeling with Automatic Explanation", 2011 IEEE/CERMA Electronics, Robotics and Automotive Mechanics Conference, Nov. 15-18, 2011, pp. 41-46.

Tang, J., "A Peer Dataset Comparison Outlier Detection Model Applied to Financial Surveillance", 2006 18th IEEE/ICPR International Conference on Pattern Recognition, vol. 4, IPCR vol. 4, 2006, pp. 900-903.

International Search Report and Written Opinion dated Jun. 10, 2014 for PCT/US2014/036048, pp. 1-10.

* cited by examiner

METHODS AND SYSTEMS FOR TRANSACTIONAL RISK MANAGEMENT

FIELD OF THE INVENTION

The present invention relates generally to the field of transactional risk management, and more particularly to methods and systems for assessing and managing transactional risk.

BACKGROUND OF THE INVENTION

A current trend among enterprises is a continuing effort by such enterprises to cut their costs and to consolidate and/or outsource their account payments processes, for example, to shared service centers. This increase in consolidation and outsourcing account payments processes has created a corresponding need for enterprises to increase controls and to implement additional checks and balances through early warning systems. In the current environment, fraud increasingly presents a challenge for enterprises, and the Federal Financial Institutions Examination Council (FFIEC) has recommended that transactional risk assessment be implemented.

There is a present need for improvements in enterprise governance models that ensure that enterprises have checks and balances and plans and solutions to manage operational risks. There is also a need to enable financial institutions, such as banks, to provide early warning solutions and risk management tools that assist their clients in improving their governance and likewise managing their operational risks. There is a further need for such early warning solutions that provide, for example, reports of high variances in payment patterns, new payees, high value payments, and uncommon payments. There is an additional need for such warning solutions that perform predictive analyses to identify potential outliers in payment operations and to help enterprises identify any breaks and gaps in their payments processes.

SUMMARY OF THE INVENTION

Embodiments of the invention employ computer hardware and software, including, without limitation, one or more processors coupled to memory and non-transitory, computer-readable storage media with one or more executable computer application programs stored thereon which instruct the processors to perform the methods and systems for assessing and managing transactional risk described herein.

Embodiments of the invention provide methods and systems for assessing and managing transactional risk that may involve, for example, receiving, using a processor coupled to memory, payment transaction information for an entity; assessing, using the processor, the payment transaction information for a predetermined level of risk based at least in part on a payment transaction history of the entity; generating, using the processor, a report of the predetermined level of risk; and processing, using the processor, the payment transaction for the entity according to predefined processing instructions of the entity.

In aspects of embodiments of the invention, receiving the payment transaction information may involve, for example, receiving the payment transaction information for a non-retail customer entity. In other aspects, receiving the payment transaction information may involve, for example receiving the payment transaction information via an online banking platform of a financial institution. In further aspects, receiving the payment transaction information may involve, for example, receiving the payment transaction information manually, via a website portal provided by a financial institution, or via a file or a messaging system, such as Society for Worldwide Interbank Financial Telecommunication (SWIFT).

In additional aspects of embodiments of the invention, assessing the payment transaction information may involve, for example, assessing the payment transaction information for the predetermined level of risk based at least in part on the payment transaction history of the entity and at least in part on risk level parameters established by the entity. In further aspects, assessing the payment transaction information based at least in part on the risk level parameters established by the entity may involve, for example, receiving the risk level parameters from the entity via a website of a financial institution. In other aspects, receiving the risk level parameters from the entity may involve, for example, receiving at least one adjustment of the risk level parameters from the entity via the website of the financial institution.

In further aspects of embodiments of the invention, assessing the payment transaction information based at least in part the payment transaction history may involve, for example, creating a payment transaction profile for the entity based on predefined attributes of payment transactions previously processed for the entity. In additional aspects, assessing the payment transaction information may involve, for example, assessing the payment transaction information before executing payment according to the payment transaction information. In further aspects, assessing the payment transaction information may involve, for example, assessing the payment transaction information after executing payment according to the payment transaction information.

In other aspects of embodiments of the invention, assessing the payment transaction information for the predetermined level of risk may involve, for example, assessing the payment transaction information for at least one predefined payment outlier indicative of the predetermined level of risk. In still other aspects, assessing the payment transaction information for the at least one predefined payment outlier indicative of the predetermined level of risk may involve, for example, assessing the payment transaction information for at least one predefined payment outlier indicative of a fraudulent payment transaction.

In still further aspects of embodiments of the invention, generating the report or notification of the predetermined level of risk may involve, for example, generating a report or notification of at least one predefined payment outlier indicative of the predetermined level of risk. In additional aspects, generating the report or notification of at least one predefined payment outlier indicative of the predetermined level of risk may involve, for example, generating the report or notification of at least one predefined payment outlier indicative of a fraudulent payment transaction.

In still other aspects of embodiments of the invention, generating the report or notification may involve, for example, providing the report or notification of the predetermined level of risk to the entity before executing the payment transaction according to the payment transaction information. In other aspects, providing the report or notification to the entity before executing the payment transaction may involve, for example, prompting the entity to enter a decision for approval or denial before executing the payment transaction according to the payment transaction information. In additional aspects, generating the report or notification may involve, for example, providing the report or notification of the predetermined level of risk to the entity after executing the payment transaction according to the payment transaction information. In still further aspects, generating the report or notification may involve, for example, generating a metric that encapsulates the predetermined level of risk for the entity.

In additional aspects of embodiments of the invention, processing the payment transaction for the entity according to the predefined processing instructions may involve, for example, executing the payment transaction for the entity. In further aspects, processing the payment transaction for the entity according to the predefined processing instructions may involve, for example, executing the payment transaction for the entity in response to receiving the entity's entry of an approval of the payment transaction based on a risk metric provided to the entity.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention utilize one or more special purpose computer software application program processes, each of which is tangibly embodied in a physical storage device executable on one or more physical computer hardware machines, and each of which is executing on one or more of the physical computer hardware machines (each, a "computer program software application process"). Physical computer hardware machines employed in embodiments of the invention comprise, for example, input/output devices, motherboards, processors, logic circuits, memory, data storage, hard drives, network connections, monitors, and power supplies. Such physical computer hardware machines include, for example, user machines and server machines that may be coupled to one another via a network, such as a local area network, a wide area network, or a global network through telecommunications channels which may include wired or wireless devices and systems.

The payments risk management tool for embodiments of the invention differs from existing fraud detection systems in several respects. For example, embodiments of the invention provide a tool for enterprises, such as financial institutions or business or governmental entities that are making enterprise payments instead of retail customers making payments in retail transactions. The payments risk management tool for embodiments of the invention may enable such enterprises to get information about fraud and operational risk issues associated with their own payment transactions.

An initial step for embodiments of the invention may be for a financial institution to collect a client's payment data using the history of payments processed through the financial institution by the client or alternatively payments data processed by another financial institution but received through a file from the client or through the SWIFT channel directly from the processing financial institution. Such payment data may then be used to create a client payment data profile in terms, for example, of how many payments the client processes, the average payments the client processes per month. Such payment profile data may also include, for example, which users and systems of the enterprise are usually involved in initiating and authorizing payment, and from which IP addresses and in which time zones they are usually initiated and authorized, as well as other payment attributes. Based on those attributes, a payment data profile may be created for the client that indicates, for example, a client payment level, a client user level, and a client user session level. It is to be understood that the foregoing payment attributes are examples only and that client profiles for embodiments of the invention may include and/or be based upon any other suitable payment data and/or payment attributes.

Embodiments of the invention may provide client-entities of the financial institution an early warning tool and help such clients to manage their risks, especially in terms of identifying any payment outliers in their day-to-day transactions. The payments risk management tool may analyze payment data across channels, regions and payments types to help clients identify such payment outliers in both post payment processing assessment and pre-payment processing assessment. In the pre-payment assessment aspect, the enterprise may be provided with assessment results in advance of a payment transaction and may stop the payment transaction before it is made. In addition, the enterprise for whose benefit the tool for embodiments of the invention is provided may adjust thresholds of the risk management tool. Thus, risk tolerances of the payment risk management tool for embodiments of the invention may be adjusted by the enterprise itself.

Figure 1:
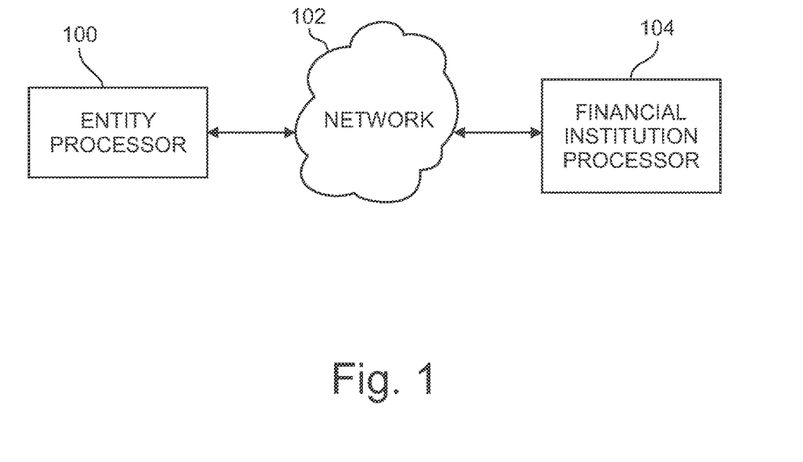
FIG. 1 is a schematic diagram that illustrates an overview example of key components and the flow of information between such components for embodiments of the invention.

FIG. 1 is a schematic diagram that illustrates an overview example of key components and the flow of information between such components for embodiments of the invention. Referring to FIG. 1, the payments risk management tool for embodiments of the invention may employ, for example, an entity processor 100 coupled over a network 102 to a financial institution processor 104. The payments risk management tool may be hosted on the financial institution's online banking platform and may provide, for example, sophisticated analytics capabilities by consolidating transactional information across legal entities, accounts, payment methods and entry points. In addition, the payments risk management tool may be integrated, for example, with the financial institution's electronic banking platform, which may allow real-time observation of a client's payments data, user data and session data and apply algorithms and return alerts or notifications to the client. Thus, institutional clients may review such alerts or notifications and take appropriate action.

Figure 2:
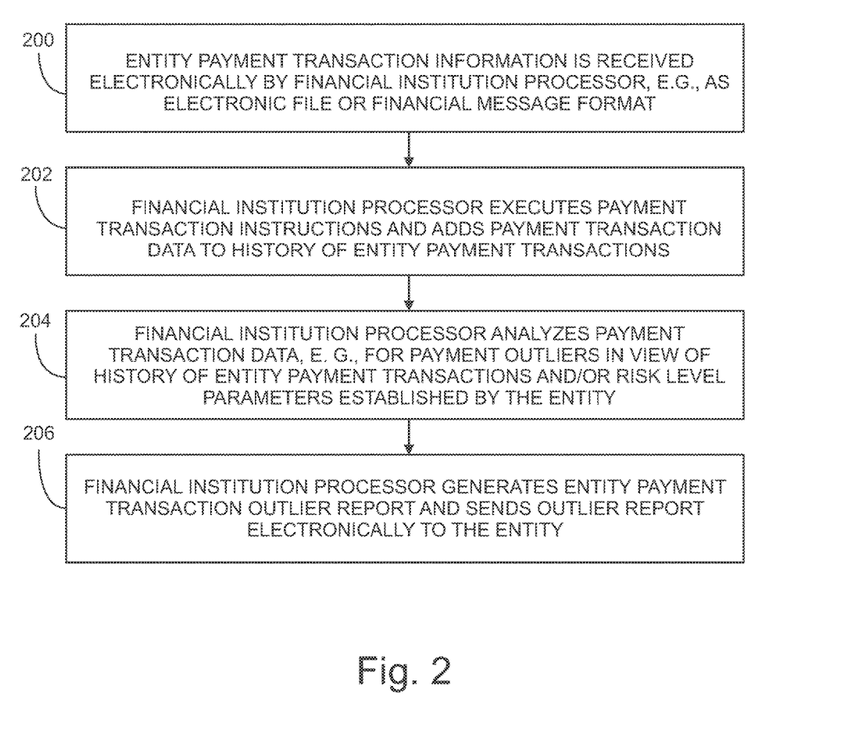
FIG. 2 is a flow diagram that illustrates an example of a post-payment process aspect of transactional risk management for embodiments of the invention.

The post processing aspect for embodiments of the invention may involve, for example, identification of any payment outliers after a payment is processed. FIG. 2 is a flow diagram that illustrates an example of the post-payment processing aspect of transactional risk management for embodiments of the invention. Referring to FIG. 2, at 200, entity payment transaction information may be received electronically by a financial institution processor 104, for example, as an electronic file or in financial message format such as SWIFT from the entity processor 100. At 202, the financial institution processor 104 may execute the payment transaction instructions and add payment transaction data to a history of the entity's payment transactions. At 204, the financial institution processor 104 may analyze the payment transaction data, for example, for payment outliers in view of the history of the entity's payment transactions and/or risk level parameters established by the entity. At 206, the financial institution processor 104 may generate an entity payment transaction outlier report and send the outlier report electronically to the entity's processor.

In the post payment aspect for embodiments of the invention, at 200, a client-entity may input payment information on a website portal provided by the financial institution. The payment may then be processed and the payees identified in the payment information may be paid at 202. Thereafter, at 204, any transaction performed by the client may be compared with the history that has been created for the client and, at 206, any outliers that deviate from the client payment data profile may be identified and highlighted for client review and appropriate action. The post-transaction scenario for embodiments of the invention may detect outliers (e.g., operation errors and perhaps fraudulent transactions) and minimize future occurrences of a similar nature. Outlier reports may be generated in connection with the payments that may enable clients to identify potential payment outliers and thus improve visibility, control and security of their payments. Such outlier reports may include, for example, high variances reports by currency, payee and payment methods, repeat and duplicate payments, high value payments, and payments to new payees.

Embodiments of the invention may provide clients a metric that encapsulates the riskiness of a transaction. As noted, an aspect of embodiments of the invention may provide clients an after-the-fact metric or riskiness measure for client transactions that can be reviewed by clients ex post facto. Another aspect of embodiments of the invention may provide clients a risk metric for client transactions in real time that enables appropriate personnel within a client's organization to review transactions before they are executed. Thus, a decision may be made by the client's personnel whether or not to proceed with a particular transaction based on the risk metric provided. In either the post payment aspect or the pre-payment aspect, the risk metric may be based on parameters determined by the client, and the client who initiates payment transactions is the actual beneficiary and user of the risk metric.

Figure 3:
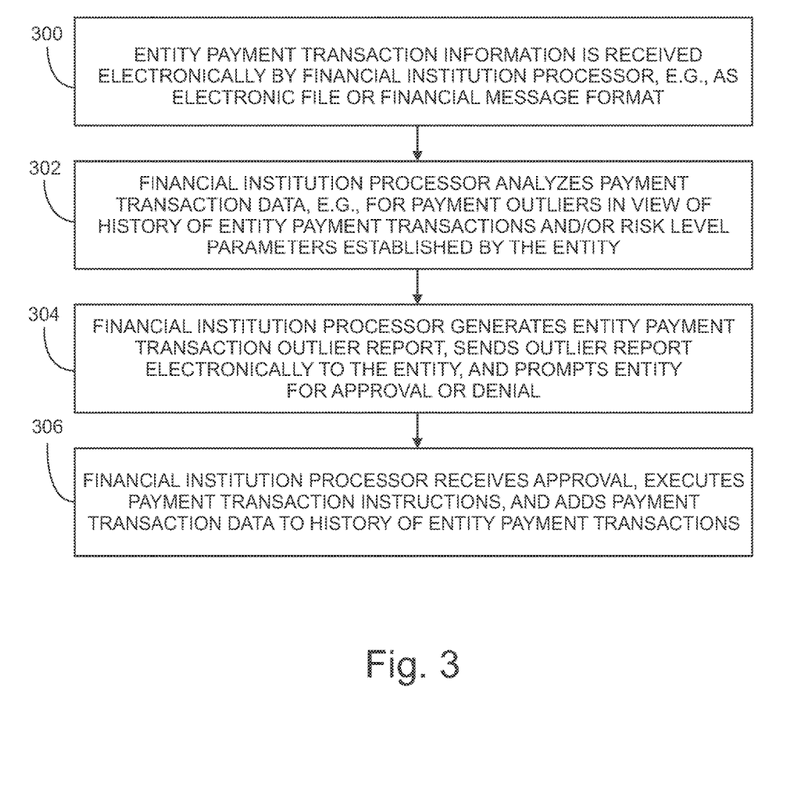
FIG. 3 is a flow diagram that illustrates an example of a pre-payment process aspect of transactional risk management for embodiments of the invention.

The pre-payment aspect may provide a preventive mechanism to identify any payment outliers before a payment is processed and paid to a payee. FIG. 3 is a flow diagram that illustrates an example of the pre-payment process aspect of transactional risk management for embodiments of the invention. Referring to FIG. 3, at 300, entity payment transaction information may likewise be received electronically by the financial institution processor 104, for example, as an electronic file or in financial message format such as SWIFT from the entity processor 100. At 302, the financial institution processor 104 may analyze the payment transaction data, for example, for payment outliers in view of the history of the entity's payment transactions and/or risk level parameters established by entity. At 304, the financial institution processor 104 may generate an entity payment transaction outlier report, send the outlier report electronically to the entity's processor 100, and prompt the entity for approval or denial. Thereafter, at 306, the financial institution processor may receive the entity's approval, execute the payment transaction instructions, and add payment transaction data to the history of the entity's payment transactions. On the other hand, if the entity's denial is received, the payment transaction may be stopped.

In the pre-payment aspect, a client-entity may likewise input payment information on the website portal provided by a financial institution. Upon receipt of the payment information at 300, a real-time or near real-time risk assessment may be generated and displayed at 302, 304 for client's staff via the website portal to review and approve or deny one or more payments. When approved, the payments may then be processed, and the payees identified in the payment information may be paid at 306. Thus, the pre-payment processing mechanism for embodiments of the invention may enable real-time identification of such outliers and potentially stop the processing of suspicious or fraudulent payments from clients' accounts.

As previously noted, the type of clients for which embodiments of the invention are primarily intended are institutional entities, such as banks, businesses or public sector bodies which need solutions to help them reduce losses in terms of fraud, as well as errors, that may result from processing payment transactions that should not have been processed. In the pre-payment aspect, every transaction may be assessed for risk using the client's transaction history profiled across numerous characteristics of transactions, user and user sessions. Based on such assessment, transactions deemed to be high-risk payments may be raised as actionable alerts for investigation. Further, the payment risk management solution for embodiments of the invention self-learns and builds the client profile, for example, employing highly intelligent analytical models to highlight uncommon payment patterns by payee, payment type and currency. In doing so, the payment risk management solution for embodiments of the invention may employ, for example, risk assessment programs, analytic models, self-learning techniques, client profiles, and alerting and rules engines.

In the pre-payment aspect for embodiments of the invention, when a client initiates a payment transaction, the client may be asked for a decision on whether it wants to proceed with the transaction if it fits a particular pattern and falls within parameters that were provided by the client. Embodiments of the invention may provide clients a website to set up such parameters. For example, within such website, clients may be provided an ability to determine their own parameters and thresholds and thus determine the criteria for the types of transactions they wish to have flagged. Clients are able to determine such parameters and set the parameters up themselves in such website and have transactions that meet the criteria selected by them presented to them on the same website.

When transactions are presented for a client on the website, the appropriate personnel may review the particular transactions and make a decision on whether or not to allow the transactions to proceed. The decision may be entered on the website and sent to a financial institution system server 104. When a client's decision to allow a transaction is received, the transaction may be processed, and when the client's decision not to allow the transaction is received, the transaction may be stopped. Further, the client's decision may be used as input to the user profile of the client as learning for the system to be taken into consideration if and when a similar transaction is encountered by the system on a subsequent occasion. Embodiments of the invention may employ one or more rules engines in making decisions on data received. Other embodiments may employ and leverage different technologies, such as neural networks and/or genetic algorithms, and any number of suitable analytical models or combinations of analytical models. It is to be understood that in a post-payment scenario, the client may access the financial institution's website to review the reports and make a determination on any outlier transactions of whether they are acceptable or not. In this way the payment risk management solution for embodiments of the invention can be self-learning even in the post-payment scenario.

The client website for embodiments of the invention may display, for example, analytics highlighting potential outliers based on client-selected thresholds, such as high value payments or frequent payments. For example, while there may be valid operational reasons for frequent payments to the same payee, such payments may indicate multiple payments of the same invoices. Other potential outliers may be based, for example, on new and infrequent payees and/or any payee to whom payments have not been made within a long period of time. Embodiments of the invention may provide real-time, criteria-based reports for clients that help them manage their operational risks and identify any potential outliers that do not ordinarily occur.

It is to be noted that while clients may refer to post-transaction reports of outliers to fine-tune their preferred parameters and thresholds, an aspect of embodiments of the invention may be real-time presentation of transaction reports on the client website that allows clients to modify their parameters and thresholds on the website itself. Embodiments of the invention may allow a client to establish payment transaction parameters with respect to particular payees, to particular types of businesses, in particular countries, in particular currencies, with respect to certain payment amounts, and/or any of countless other different types of parameters.

A particular client may initiate payment transactions in various ways. For example, a client may make payments to a financial institution using the financial institution's website, or the client may have its own system that sends a payment transaction file electronically to the financial institution's system. In either event, the payment transaction may be received by the financial institution's internal processing engines 104. When received, the financial institution's internal processing engines may connect to a payment risk management engine, which may then review the transaction based on the parameters established by client and/or based on historical client transaction data. Thereafter, the risk system or engine may send a risk metric to the website where the client's personnel may view those transactions that exceeded the client's threshold. A decision of whether or not to proceed with the transaction may then be entered by the client's personnel on the website, which is sent back to the risk engine. The risk engine may then use that data for future learning. Occasionally, a decision from the client's personnel on whether or not to proceed with a transaction may be unduly delayed. To address the possibility of such an occurrence, embodiments of the invention may allow the client to establish specific parameters, such as to proceed with a payment after a predefined period of non-responsiveness or to hold the payment indefinitely until a decision is received.

Figure 4:
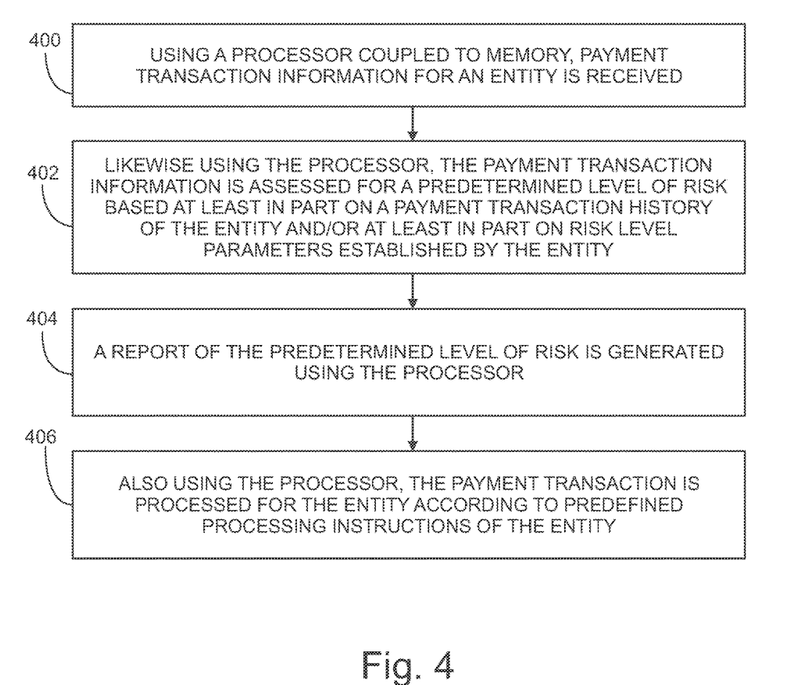
FIG. 4 is a flow chart that illustrates another example of the process of transactional risk management for embodiments of the invention.

FIG. 4 is a flow chart that illustrates another example of the process of transactional risk management for embodiments of the invention. Referring to FIG. 4, at 400, using a processor coupled to memory, payment transaction information for an entity may be received. At 402, likewise using the processor, the payment transaction information may be assessed for a predetermined level of risk based at least in part on a payment transaction history of the entity and/or at least in part on risk level parameters established by the entity. At 404, a report of the predetermined level of risk may be generated using the processor. At 406, also using the processor, the payment transaction may be processed for the entity according to predefined processing instructions of the entity. Such processing instructions may include, for example, assessing the payment transaction information after executing payment. Alternatively, such processing instructions may include, for example, assessing the payment transaction information before executing payment.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices, or tablets or mobile phones. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
    establishing, by a risk management engine processor of a financial institution, an initial payment data profile for each of a plurality of customers on the risk management engine processor based at least in part on a plurality of payments risk level parameters received from respective system processors of respective ones of the plurality of customers via a website portal processor;
    receiving, by an internal processing engine processor of the financial institution, from the system processor of respective ones of said plurality of customers via the website portal processor, payment transaction information for executing a payment for each of said respective ones of said plurality of customers to respective payees of each of said respective ones of said plurality of customers;
    generating, by the risk management engine processor communicatively coupled to the internal processing engine processor, in real time before executing the payment for each of said respective ones of said plurality of customers, a determination of a level of risk in executing the payment based at least in part on the respective initial payment data profiles established for each of said respective ones of said plurality of customers;
    communicating, by the internal processing engine processor to the respective system processors of said respective ones of the plurality of customers, in real time the determination of the level of risk in executing the payment for each of said respective ones of said plurality of customers with an approval or denial request message before executing the payment for said respective ones of said plurality of customers to the respective payees of said respective ones of said plurality of customers;
    receiving, by the internal processing engine processor, from the system processor, the requested approval or denial message for executing the payment for said respective ones of said plurality of customers to the respective payees of said respective ones of said plurality of customers;
    executing, by the internal processing engine processor, the payment for respective ones of said plurality of customers if a payment approval message is received by the internal processing engine processor and declining execution of the payment by the internal processing engine processor if a payment denial message is received by the internal processing engine processor; and
    building, by the risk management engine processor communicatively coupled to the internal processing engine processor, using at least one self-learning algorithm, an update of the initial payment profile for each of said respective ones of said plurality of customers based at least in part on the received approval or denial message for executing the payment as learning for the risk management engine processor.

2. The method of claim 1, wherein receiving the payment transaction information further comprises receiving the payment transaction information for at least one of the plurality of customers that is at least one non-retail customer of the financial institution.

3. The method of claim 1, wherein generating the determination of the level of risk in executing the payment further comprises generating the determination of the level of risk in executing the payment based at least in part on at least one predefined payment outlier.

4. The method of claim 3, wherein generating the determination of the level of risk in executing the payment further comprises generating the determination of the level of risk in executing the payment based at least in part on the at least one predefined payment outlier indicative of a fraudulent or uncommon payment transaction.

5. The method of claim 1, wherein communicating the determination of the level of risk in executing the payment further comprises communicating the determination of the level of risk in executing the payment based at least in part on at least one predefined payment outlier.

6. The method of claim 5, wherein communicating the determination of the level of risk further comprises communicating the determination of the level of risk in executing the payment based at least in part on the at least one predefined payment outlier indicative of a fraudulent or uncommon payment transaction.

7. A machine, comprising:
    a risk management engine processor of a financial institution programmed to:
        establish, an initial payment data profile for each of a plurality of customers on the risk management engine processor based at least in part on a plurality of payments risk level parameters received from respective system processors of respective ones of the plurality of customers via a website portal processor;
    an internal processing engine processor of the financial institution programmed to:
        receive, from the system processor of respective ones of said plurality of customers via the website portal processor, payment transaction information for executing a payment for each of said respective ones of said plurality of customers to respective payees of each of said respective ones of said plurality of customers;
    the risk management engine processor being communicatively coupled to the internal processing engine processor and being further programmed to:
        determine in real time a level of risk in executing the payment for each of said respective ones of said plurality of customers based at least in part on the respective initial payment data profiles established for each of said respective ones of said plurality of customers;
    the internal processing engine processor of the financial institution being further programmed to:
        communicate in real time to the system processor, for each of said respective ones of said plurality of customers, the determination of the level of risk in executing the payment for each of said respective ones of said plurality of customers with an approval or denial request message before executing the payment for said respective ones of said plurality of customers to the respective payees of each of said respective ones of said plurality of customers;

receive from the system processor the requested approval or denial message for executing the payment for said respective ones of said plurality of customers to the respective payees of said respective ones of said plurality of customers;

execute the payment for said respective ones of said plurality of customers if a payment approval message is received by the internal processing engine processor and decline execution of the payment by the internal processing engine processor if a payment denial message is received by the internal processing engine processor; and the risk management engine processor communicatively coupled to the internal processing engine processor being further programmed to:

build, with at least one self-learning algorithm, an update of the initial payment profile for each of said respective ones of said plurality of customers based at least in part on the received approval or denial message for executing the payment for said respective ones of said plurality of customers to the respective payees of said respective ones of said plurality of customers as learning for the risk management engine processor.

8. A method, comprising:

establishing, by a risk management engine processor of a financial institution, an initial payment data profile for each of a plurality of customers on the risk management engine processor based at least in part on a plurality of payments risk level parameters received from respective system processors of respective ones of the plurality of customers via a website portal processor;

receiving, by an internal processing engine processor of the financial institution, from the system processor of respective ones of said plurality of customers via the website portal processor, payment transaction information for executing a payment for each of said respective ones of said plurality of customers to respective payees of each of said respective ones of said plurality of customers;

executing, by the internal processing engine processor, in real time the payment by the financial institution for each of said respective ones of said plurality of customers of the financial institution to respective payees of respective ones of said plurality of customers according to predefined processing instructions of each of said respective ones of said plurality of customers of the financial institution;

generating, by the risk management engine processor communicatively coupled to the internal processing engine processor, in real time after executing the payment for each of said respective ones of said plurality of customers, a determination of a level of risk in executing the payment based at least in part on the respective initial payment data profiles established for each of said respective ones of said plurality of customers;

communicating, by the internal processing engine processor to the respective system processors of said respective ones of the plurality of customers, in real time, the determination of the level of risk after executing the payment for said respective ones of said plurality of customers to the respective payees of said respective ones of said plurality of customers; and building, by the risk management engine processor communicatively coupled to the internal processing engine processor, using at least one self-learning algorithm, an update of the initial payment profile for each of said respective ones of said plurality of customers based at least in part on execution of the payment for said respective ones of said plurality of customers to the respective payees of said respective ones of said plurality of customers as learning for the risk management engine processor.

\* \* \* \* \*